(12) United States Patent  
Giefer et al.

(10) Patent No.: US 8,490,509 B2  
(45) Date of Patent: Jul. 23, 2013

(54) OPERATING DEVICE WITH GATE SHAFTS

(75) Inventors: Andreas Giefer, Lemforde (DE);  
Ludger Rake, Diepholz (DE)

(73) Assignee: ZF Friedrichshafen AG,  
Friedrichshafen (DE)

( * ) Notice: Subject to any disclaimer, the term of this patent is extended or adjusted under 35 U.S.C. 154(b) by 357 days.

(21) Appl. No.: 12/744,978

(22) PCT Filed: Dec. 4, 2008

(86) PCT No.: PCT/DE2008/050035  
§ 371 (c)(1),  
(2), (4) Date: May 27, 2010

(87) PCT Pub. No.: WO2009/071080  
PCT Pub. Date: Jun. 11, 2009

(65) Prior Publication Data  
US 2010/0307276 A1   Dec. 9, 2010

(30) Foreign Application Priority Data  
Dec. 5, 2007 (DE) .................. 10 2007 058 922

(51) Int. Cl.  
*B60K 20/00* (2006.01)

(52) U.S. Cl.  
USPC ................. 74/473.25; 74/473.1; 74/473.3

(58) Field of Classification Search  
USPC .......... 74/335, 473.1, 473.21–473.25, 473.3, 74/473.36–473.37, 473.12, 473.18, 567, 74/55, 56, 57  
See application file for complete search history.

(56) References Cited

U.S. PATENT DOCUMENTS

| | | | | |
|---|---|---|---|---|
| 6,231,476 | B1 * | 5/2001 | Reasoner et al. | 477/99 |
| 6,386,061 | B1 * | 5/2002 | Giefer | 74/473.18 |
| 6,443,026 | B1 * | 9/2002 | Arakawa et al. | 74/473.32 |
| 6,684,730 | B2 * | 2/2004 | Giefer et al. | 74/473.23 |
| 6,688,448 | B2 * | 2/2004 | Giefer et al. | 192/219.4 |
| 7,137,313 | B2 * | 11/2006 | Giefer et al. | 74/473.12 |
| 7,204,169 | B2 * | 4/2007 | Mitchell | 74/489 |
| 7,568,404 | B2 * | 8/2009 | Grossman et al. | 74/473.23 |
| 7,712,392 | B2 * | 5/2010 | Molkow et al. | 74/473.21 |
| 2003/0074999 | A1 * | 4/2003 | Shioji et al. | 74/473.21 |
| 2004/0083858 | A1 * | 5/2004 | Carnesi | 81/63 |

(Continued)

FOREIGN PATENT DOCUMENTS

| | | |
|---|---|---|
| DE | 197 33 206 C1 | 10/1998 |
| DE | 199 57 866 A1 | 6/2001 |

(Continued)

*Primary Examiner* — Justin Krause  
*Assistant Examiner* — Alexander Vu  
(74) *Attorney, Agent, or Firm* — Davis & Bujold, PLLC (57) ABSTRACT

An actuating device for a gear shifting transmission. The actuating device includes a selector lever which has stable selector lever positions, and a detent mechanism with a detent element and notched gate, the detent element is connected to the selector lever. The notched gate is disposed on a gate shaft that rotates when actuated. The gate shaft includes at least one helical return groove for the detent element. Due to rotation of the gate shaft, the detent element can be transferred from a start position, along the return groove, into a target position. The selector lever position always reflects the actual gear stage of the transmission, even with shift-by-wire-controlled gear shifting transmissions. The driver is provided with reliable visual and tactile feedback about the gear state of the transmission. The actuating device is structurally reliable, has low energy consumption, produces minimal noise, and requires minimal construction space.

17 Claims, 6 Drawing Sheets

U.S. PATENT DOCUMENTS

| | | | |
|---|---|---|---|
| 2004/0123687 A1* | 7/2004 | Kato | 74/56 |
| 2004/0163924 A1* | 8/2004 | Wendeberg et al. | 192/219 |
| 2005/0022622 A1* | 2/2005 | Mitteer | 74/473.3 |
| 2005/0160859 A1* | 7/2005 | Buerger et al. | 74/473.1 |
| 2006/0060019 A1* | 3/2006 | Sato et al. | 74/473.23 |
| 2008/0028886 A1 | 2/2008 | Molkow et al. | |
| 2008/0072698 A1* | 3/2008 | Hirano | 74/473.21 |
| 2008/0098849 A1* | 5/2008 | Wang | 74/523 |
| 2010/0024584 A1* | 2/2010 | Giefer et al. | 74/473.18 |
| 2010/0071506 A1 | 3/2010 | Kliemannel et al. | |
| 2010/0307276 A1* | 12/2010 | Giefer et al. | 74/473.3 |
| 2012/0144949 A1* | 6/2012 | Kim et al. | 74/473.33 |

FOREIGN PATENT DOCUMENTS

| | | |
|---|---|---|
| DE | 100 05 328 A1 | 8/2001 |
| DE | 20 2006 006 763 U1 | 7/2006 |
| DE | 10 2005 023 926 A1 | 11/2006 |
| DE | 10 2005 053 610 A1 | 5/2007 |
| WO | WO 2006125608 A1 * | 11/2006 |
| WO | 2008/106950 A1 | 9/2008 |
| WO | 2008/116437 A1 | 10/2008 |
| WO | 2008/116461 A1 | 10/2008 |

* cited by examiner

OPERATING DEVICE WITH GATE SHAFTS

This application is a National Stage completion of PCT/DE2008/050035 filed Dec. 4, 2008, which claims priority from German patent application serial no. 10 2007 058 922.2 filed Dec. 5, 2007.

FIELD OF THE INVENTION

The invention relates to an actuating device for a gear shifting transmission, e.g. for an automatic transmission having shift-by-wire actuation.

BACKGROUND OF THE INVENTION

Gear shifting transmissions of motor vehicles are usually controlled or shifted using an actuating device disposed within reach of the driver. Actuating elements such as shift levers or selector levers are used customarily for this purpose, and are disposed between the front seats of the motor vehicle, for example.

The structural and ergonomic requirements on actuating devices of this type for gear shifting transmissions are diverse. For example, to provide the driver with a realistic feel for the actuation of the transmission for reasons of safety and ergonomics, a requirement of actuating devices is that the driver, when selecting a gear, be provided with clear haptic or tactile feedback about the current gear state or operating state of the transmission. Based thereon, the driver should be able to deduce the shifting operation that actually took place in the transmission when he operates the selector lever. Likewise, it should be possible for the driver to intuitively understand the current gear state of the transmission by glancing at the selector lever or by grasping the selector lever.

It is therefore desirable to provide the driver with clear visual and haptic feedback about the current transmission state or the actual gear selection position that is engaged on the basis of the particular position or angular position of the selector lever at the moment.

In the case of classical, mechanical transmission control or mechanical coupling between the selector lever and the gear shifting transmission—using a cable or linkage, for example—the selector lever position always coincides with the actual transmission position due to the mechanical coupling. Since mechanically actuated gear shifting transmissions themselves are generally multistable (that is, the transmission shifting position is stable in a plurality of positions or in all positions), the associated selector lever is likewise multistable and therefore always remains, as does the gear shifting transmission, in the position or gear selected by the driver.

As a result, the driver can deduce, on the basis of the particular selector lever position, the current gear state of the transmission, and, on the basis of the selector lever position, he can determine the gear selection position that is engaged in the transmission; the driver can feel confident that the selector lever position coincides with the actual gear state of the transmission.

However, when gears are shifted electrically, which is becoming increasingly more common, that is, when gear shifting transmissions are actuated using shift-by-wire controls, the selector lever in the passenger compartment and the motor vehicle transmission in the engine compartment are usually not mechanically coupled. Instead, in the case of shift-by-wire-controlled transmissions, the shift commands are usually transmitted from the actuating device to the motor vehicle transmission nearly exclusively via electrical or electronic signals, and the shift commands are then implemented in the transmission using an electrohydraulic system. This applies to a partial extent to modern manual transmissions, but in particular to the current generations of automatic transmissions that are generally entirely remote-controlled using actuators.

In shift-by-wire gear shifting transmissions, however, the absence of a mechanical connection between the transmission actuator system and the selector lever can, under certain basic conditions, lead to the selector lever position no longer coinciding with the gear state of the transmission.

For example, modern automatic transmissions usually include a so-called "Auto-P" function that ensures that, when the driver leaves the vehicle, the parking lock may possibly be engaged automatically in the transmission to prevent the unattended vehicle from rolling away if the driver failed to engage the parking lock before he left the vehicle. In other words, the Auto-P function, which is always automatically activated ensures that when the ignition key is removed or the driver leaves the vehicle, the parking lock is automatically engaged in the transmission, regardless of which gear selection position was actually selected using the selector lever. For example, the parking lock is engaged automatically by the Auto-P function of the transmission or the vehicle whenever the driver leaves the selector lever in the neutral position, in a tip gate that may be present, or in one of the gear selection positions.

In this case however, the selector lever position does not coincide with the actual gear state of the transmission. When the driver would return to the vehicle or attempt to start the vehicle, the position of the selector lever would therefore provide the driver—visually and haptically—with incorrect information. On the basis of his perception of the selector lever position, the driver would have to assume that the transmission is engaged in a neutral position or in a gear selection position, although the transmission is actually engaged in the parking lock. To prevent the driver from being misinformed in this manner, an additional signaling device would therefore have to be provided especially for the driver, that, if the parking lock had been engaged by Auto-P, would signal to the driver that the selector lever must first be moved manually into the parking lock position and, therefore, in conformance with the actual gear state of the transmission, before the vehicle can be started.

An attempt is made in the prior art to address the problems presented herein by designing the selector lever of shift-by-wire gear shifting transmissions as monostable actuating elements. This means that a monostable selector lever of this type always returns to the same center position after it has been actuated. Thus, in the case of a monostable selector lever, the communication regarding the actual gear state of the transmission is left exclusively to a separate display, for example using light-emitting diodes. When a monostable selector lever is utilized, however, the driver is unable to obtain visual or haptic feedback about the gear state of the transmission based on the position of the selector lever. Furthermore, the implementation of the mechanical shift logic and the necessary shift interlocks—such as the so-called "key lock" and "shift lock" interlocks, for example—in monostable selector levers is often complex and requires a complicated actuator system to selectively block impermissible shift commands depending on the driving condition of the motor vehicle; this is structurally complex and correspondingly costly.

The known monostable actuating devices also have the disadvantage that the driver must become familiar with a new operating concept that includes a lever that always aims to return to the center position, wherein this operating concept differs considerably from traditional transmission actuation using stable selector lever positions.

SUMMARY OF THE INVENTION

Proceeding from this background, the problem addressed by the present invention is therefore that of creating an actuating device for a gear shifting transmission, with which the stated disadvantages found in the prior art can be overcome. The purpose of the invention is to make it possible for the selector lever position to always reflect the actual gear state of the transmission, even with shift-by-wire-controlled gear shifting transmissions, whereby reliable visual and tactile feedback about the actual gear state of the transmission can be realized. In particular, in the case that the parking lock has been automatically engaged ("Auto-P"), it must be prevented that the selector lever misleadingly remains in one of the gear selection positions or in the tip gate even though the transmission is actually engaged in the parking lock.

Considered, at first on its own, in the known manner, the actuating device according to the present invention comprises a selector lever that can be moved between at least one gear selection position and a parking lock position, and that has stable selector lever positions and a detent mechanism. The detent mechanism is used to hold the selector lever in the particular selector lever position that was engaged, and includes a spring-loaded detent element and a notched gate having at least two detent positions, wherein the detent element is connected to the selector lever.

However, according to the invention, however, the actuating device is characterized in that the notched gate is disposed on gate shaft that can be actuated to rotate. The gate shaft comprises at least one helically wound return groove, and the detent element can be moved, along the return groove, out of a detent element start position and into a detent element target position by rotation of the gate shaft.

According to the invention, the rotatable gate shaft with return groove results in a simple and reliable means to move the detent element and, therefore, the selector lever, using actuators. As a result, the selector lever can be returned from one of the gear selection positions, for example, to the parking lock position using actuators.

Therefore, if the vehicle driver failed e.g. to manually engage the parking lock when he turned off the vehicle, the parking lock can be engaged automatically by the transmission control after the ignition key has been removed and the driver has left the vehicle. The selector lever is automatically returned from the gear selection position that was engaged most recently into the parking lock position—by using the gate shaft according to the present invention—and therefore the actual gear state of the transmission (parking lock) finally coincides with the position of the selector lever ("P") once more.

As a result, the vehicle driver always receives appropriate visual and haptic feedback about the transmission state, in particular when the parking lock has been automatically engaged by the gear shifting transmission using the Auto-P function. As a result, not only does it prevent the driver from being provided with potentially misleading information about the transmission state, but also, comfort is increased. Comfort is increased in that—if the parking lock had been automatically engaged per Auto-P—when the driver intends to drive the vehicle again, he does not need to manually move the selector lever so that it coincides with the "parking lock" transmission state in order to start the vehicle. In addition, the driver would have to be notified of this need to return the selector lever by an additional information display that can also be eliminated due to the invention.

The return along the return groove of the gate shaft can take place using a minimal amount of actuator force, using fully uniform motion, and in an extremely quiet manner since the notched contour of the notched gate need not be passed through when the selector lever returns. Instead, the selector lever detent element returns along the return groove which can be designed to be completely smooth. Finally, due to the gate shaft, the structural design of the actuator system for returning the selector lever is also mechanically simple, robust and has only a few individual parts, thereby attaining high reliability and simultaneously attaining low costs and minimal space requirements.

The invention can be implemented regardless of what type of design is used to transfer the detent element—in order to return it—from the notched gate in the return groove of the gate shaft. An appropriate actuator system could be provided for this purpose, for example. According to a particularly preferred embodiment of the invention, however, the start position of the return groove coincides with a first detent position in the notched gate, and the target position of the return groove coincides directly with a further detent position of the notched gate.

Transferring of the detent element from the start position to the target position can be initiated and executed in this manner directly and exclusively by rotating the gate shaft since, in this embodiment, the start position and target position on the gate shaft coincide directly with the corresponding detent positions for the detent element. In other words, it is therefore not necessary to initially move the detent element out of its first detent position in the notched gate and into the start position in the return groove and—after it has been returned along the return groove—out of the target position back to the further detent position in the notched gate.

According to a further, particularly preferred embodiment of the invention, the gate shaft has a return groove for each of a plurality of different detent positions of the notched gate. All return grooves of the gate shaft lead to a common target position. Thus, the possibility results to return the detent element or the selector lever to the target position from various positions or even from all positions. For example, if "Auto-P" has been activated, the selector lever can be returned using actuators from any selector lever position to the parking lock position.

A further preferred embodiment of the invention provides that the notched gate disposed on the gate shaft includes a first detent plane having detent positions for a shift gate of the selector lever, and a further detent plane for a tip gate of the selector lever. The tip gate detent plane of the notched gate is preferably disposed on a gate ramp, wherein the gate ramp, which is directly adjacent to the shift gate detent plane, is disposed on the gate shaft.

This provides the further decisive advantage that the entire notched gate for a selector lever having shift gates and tip gates can be disposed completely on the gate shaft, by which means the invention is also applicable for selector levers having different shift gates e.g. selector levers that include different shift gates for automatic gear selection and for manual gear selection. Due to the arrangement of the tip gate detent plane on a gate ramp disposed next to the shift gate detent plane, the detent element for a selector lever having a shift gate and a tip gate can be implemented using a simple design.

In particular, in this embodiment, the gate ramp can be shaped and disposed such that the detent element—that is, a spring-loaded detent pin, for example—is always swiveled directly into the corresponding detent plane of the notched gate, simply by its following the lateral swivelling motions of the selector lever when switching between gates. As a result, even in the case of notched gates that have more than one detent plane, that is, in particular, in the case of selector levers having a shift gate and a tip gate, the detent mechanism can be designed in a mechanically simply and robust manner without using additional complicated mechanics in the area of the detent mechanism.

According to a further preferred embodiment of the invention, it is provided that the detent position of the tip gate detent plane that corresponds to the tip gate center position of the selector lever also forms the start position of a return groove of the gate shaft. This embodiment has the advantage that the selector lever can also be moved actuator-controlled and can be returned to the parking lock position if the selector lever was not left in one of the gear selection positions when the driver left the vehicle, for example, but rather was left in the tip gate. The return groove for the selector lever position "D" preferably extends beyond the shift gate detent plane directly past the center position of the tip gate detent plane and therefore leads directly into the tip gate return groove. In this manner, only one common return groove is required, which is responsible for returning the selector lever from the selector lever position "D", as well as for returning the selector lever from the center position of the tip gate.

According to a further preferred embodiment of the invention, it is provided that the actuating device includes a fixing projection that is connected to the bearing of the detent element or to the selector lever, and a release recess that is formed in the surface of the gate shaft and has a shape that corresponds to that of the fixing projection. The fixing projection enters the release recess when the selector lever is moved out of selector lever position "D" of the shift gate and into the tip gate, while the fixing projection blocks the swivelling motion of the selector lever in the direction of the tip gate in that the fixing projection bears against the surface of the gate shaft when the selector lever is not located in selector lever position "D" of the shift gate.

As a result, the design of the gate shaft is utilized for two purposes. Namely, in this manner, the gate shaft is used as described to return the detent element or the selector lever to the parking lock position. In addition, due to the fixing projection and the release recess, the gate shaft simultaneously serves the purpose of mechanically blocking the swivelling motion of the selector lever to the tip gate provided the selector lever is not located in selector lever position "D" since, in this case, the fixing projection comes to bear against the surface of the gate shaft, thereby blocking a swivelling motion of the selector lever out of the shift gate into the tip gate.

In so doing, the fixing projection and release recess preferably form a slide ramp due to their shape. The slide ramp is designed to eject the fixing projection out of the release recess as soon as the actuator-controlled rotational motion of the gate shaft to return the selector lever begins. In this manner, due to the slide ramp, which is formed by the fixing projection and the release recess, the selector lever can first be returned from the tip gate to the shift gate in an exactly controlled manner using actuators, and can then be returned to the parking lock position out of selector lever position "D" within the shift gate. In this case as well, a dual use of a design is attained by using the fixing projection and the release recess to block the movement of the selector lever into the tip gate in any selector lever position other than "N", and to actively return the selector lever, under actuator control, from the tip gate to the shift gate.

The actuator-controlled drive of the gate shaft preferably includes a worm gear pair. The worm gear pair provides the advantage of a high gear ratio in a small construction space and simultaneously results in self-inhibition without the use of additional mechanical auxiliary means, and results in minimal noise production by the selector lever actuator system.

According to a further preferred embodiment of the invention, the selector lever is supported on a single shaft in regards to its translatory shifting motions and in regards to its rotational shifting motions.

This results in a robust and space-saving design of the support and the entire shift kinematics of the selector lever using only one bearing shaft. As a result, the actuating device can be made compact, particularly in the vertical direction. Nevertheless, the distances between the individual shift positions of the selector lever are required not to be too small for secure operation and comfortable haptics can still be implemented even for very compact actuating devices. When the bearing shaft is shaped in a suitable manner, a virtual selector lever pivot axis can be implemented regarding the shifting motions of the selector lever in the direction of travel that is located far beneath the housing base of the actuating device.

BRIEF DESCRIPTION OF THE DRAWINGS

The invention is explained in the following in greater detail with reference to drawings that merely depict examples of embodiments. They show.

DETAILED DESCRIPTION OF THE PREFERRED EMBODIMENTS

Figure 1:
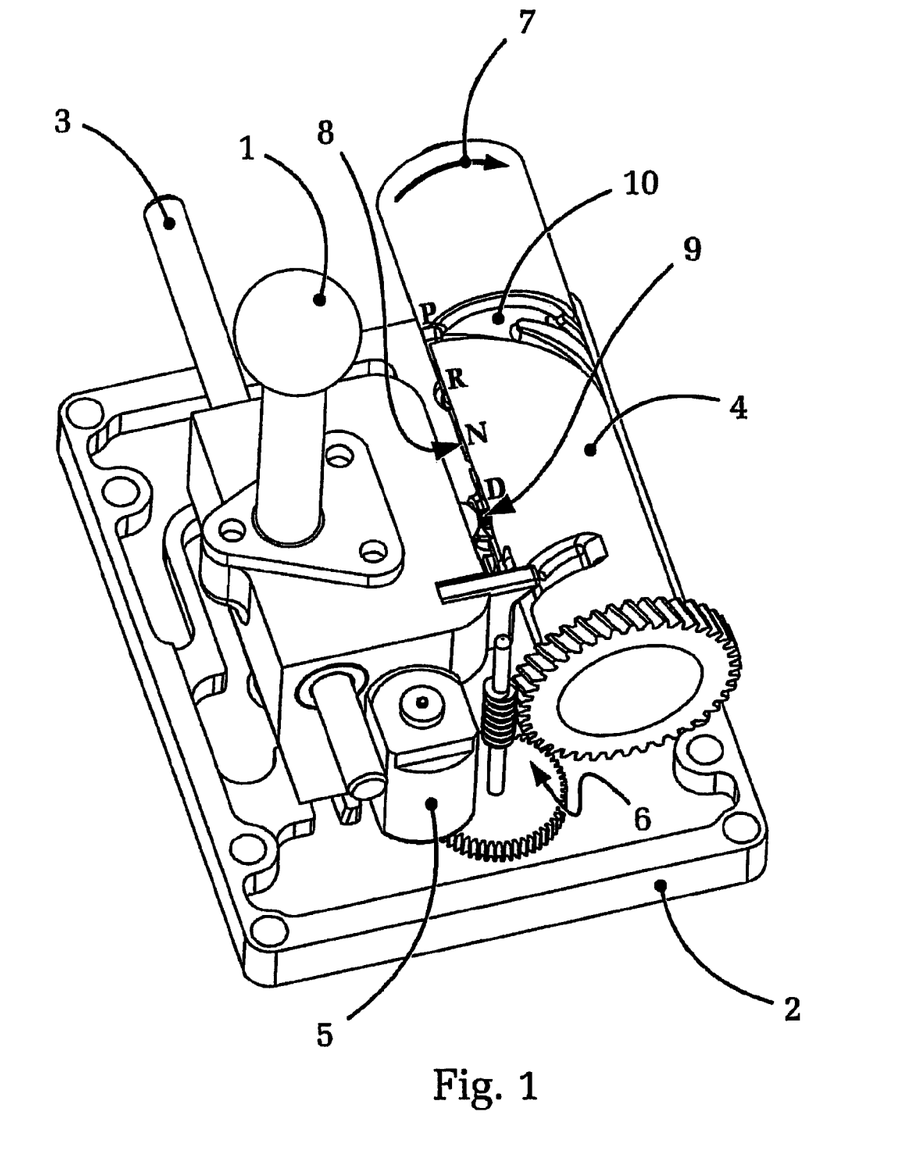
FIG. 1: a schematic, isometric view, of one embodiment of an actuating device according to the present invention, with the selector lever and detent pin in the "D" position.

FIG. 1 shows, in a schematic, isometric depiction, one embodiment of an actuating device according to the present invention. The illustration clearly shows a selector lever 1 and base 2 of the actuating device with bearing shaft 3, disposed thereon, for selector lever 1, and a gate shaft 4 that is likewise disposed on base 2. Gate shaft 4 can be rotated about its longitudinal axis, in arrow direction 7, using a servomotor 5 having a worm gear pair 6.

Notched gate 8, which is disposed on the gate shaft 7 in FIG. 1 in the "9 o'clock" position, for selector lever 1 is barely visible in FIG. 1, as is detent pin 9 which is engaged in notched gate 8; detent pin 9 is disposed in a (not-depicted) guide that is connected to selector lever 1 and is spring-loaded on selector lever 1.

Figure 2:
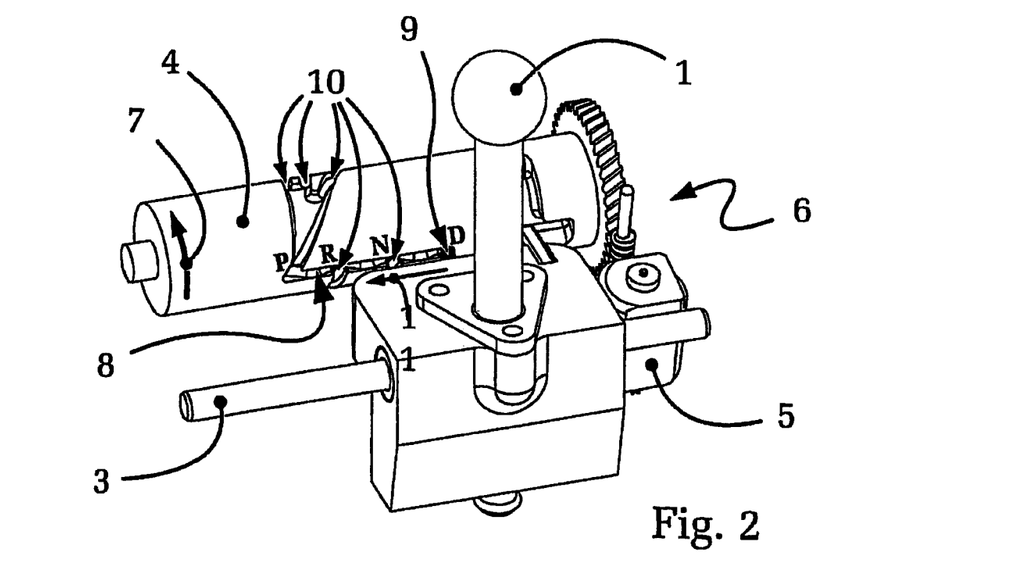
FIG. 2: a lateral view of the selector lever and gate shaft of the actuating device according to FIG. 1, in a depiction that corresponds to FIG. 1.

Notched gate 8, which is disposed on or recessed in gate shaft 4, is more clearly visible in FIG. 2. The illustration shows that, in this position (which corresponds to the position of gate shaft 4 shown in FIG. 1), gate shaft 4 includes a conventional, substantially one-dimensional-linear notched gate 8 for resilient detent pin 9, wherein notched gate 8 is composed of a series of detent recesses and guide grooves which are disposed between them and are recessed in a wavy shape along direction of motion 11 of detent pin 9. In contrast to a conventional notched gate, however, gate shaft 4 also provides a number of return grooves that extend into the second and third spatial dimensions starting from the one-dimensional-linear notched gate 8.

Figure 3:
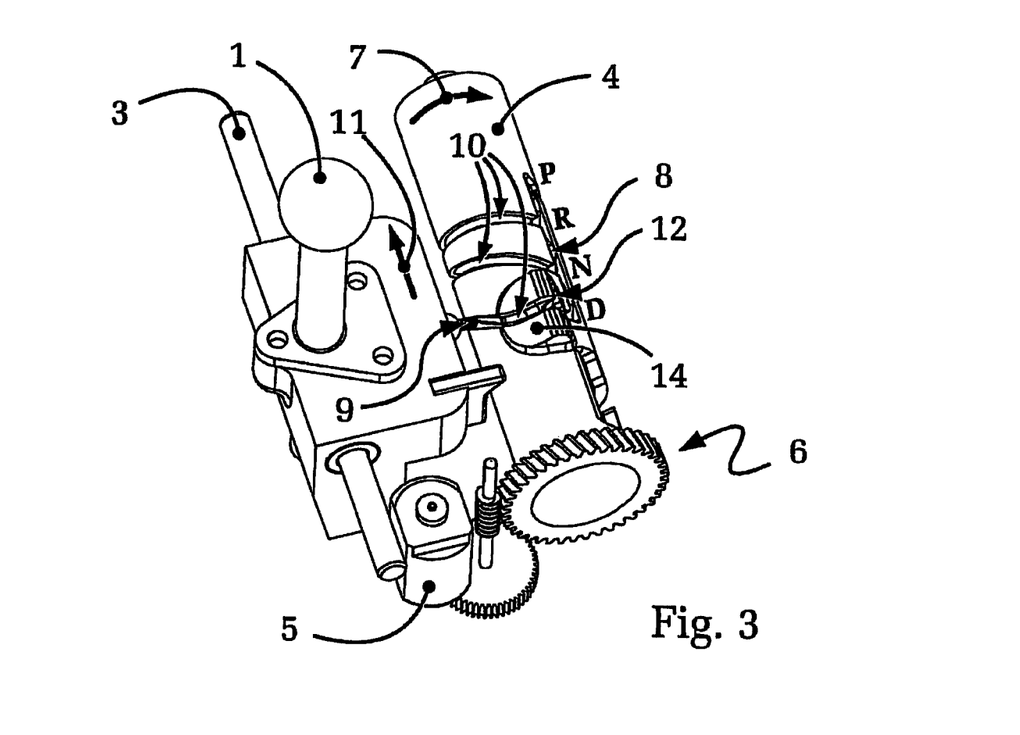
FIG. 3: the selector lever and gate shaft according to FIG. 2, in a depiction and view that correspond to FIG. 1, during the return to the parking lock position.

Using actuator-controlled rotation 5, 7 of gate shaft 4, detent pin 9 and selector lever 1 are returned in a controlled manner via return grooves 8 from any selector lever position into the parking lock position. The manner in which detent pin 9 and selector lever 1 are returned is depicted clearly with reference to the illustration shown in FIG. 3. In FIG. 3, gate shaft 4 was already rotated using actuator drive 5 by just half a rotation in the clockwise direction relative to the gate shaft position shown in FIGS. 1 and 2, and therefore, in FIG. 3, notched gate 8, which is just barely visible, is located approximately in the "2 o'clock" position relative to gate shaft 4.

Due to rotation 7 of gate shaft 4, detent pin 9 has left its detent position in shift position "D" depicted in FIGS. 1 and 2, and, in FIG. 3, is already located in return groove 10 which belongs to detent position "D" and connects detent position "D" to detent position "P" in a helical line along the surface of gate shaft 4. Due to rotation 7 of gate shaft 4, detent pin 9 and selector lever 1, which is connected to detent pin 9, are displaced linearly in arrow direction 11 shown in FIG. 3 until detent pin 9 and selector lever 1 have reached parking lock position "P". To ensure that detent pin 9 is returned to the parking lock position in a reliable, reproducible manner, a sensing device that is not depicted in the figures is connected to gate shaft 4, using which the rotation angle position of gate shaft 4 can be determined, so that the actuator drive 5 can be shut off at the correct instant after detent pin 9 has returned.

Figure 4:
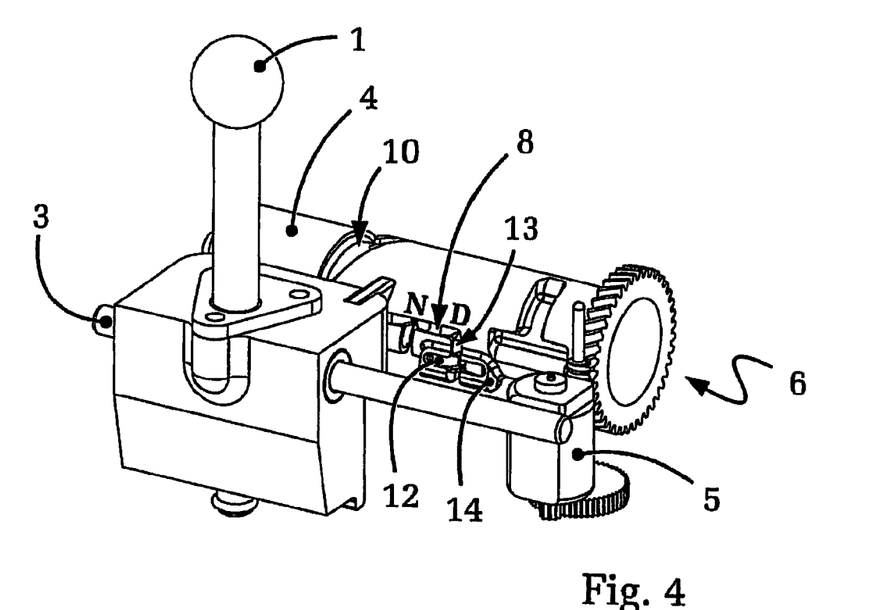
FIG. 4: the selector lever and gate shaft according to FIGS. 2 and 3, in a depiction and view that correspond to FIG. 2, with the selector lever in the parking lock position.
Figure 5:
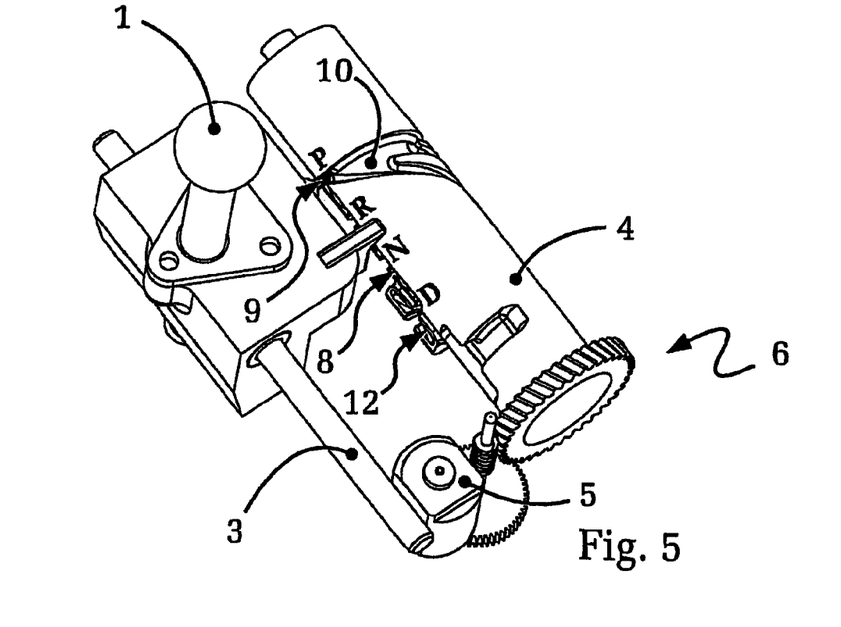
FIG. 5: the selector lever and gate shaft according to FIGS. 2 through 4, in a depiction and view that correspond to FIG. 3, with the selector lever in the parking lock position as shown in FIG. 4.
Figure 6:
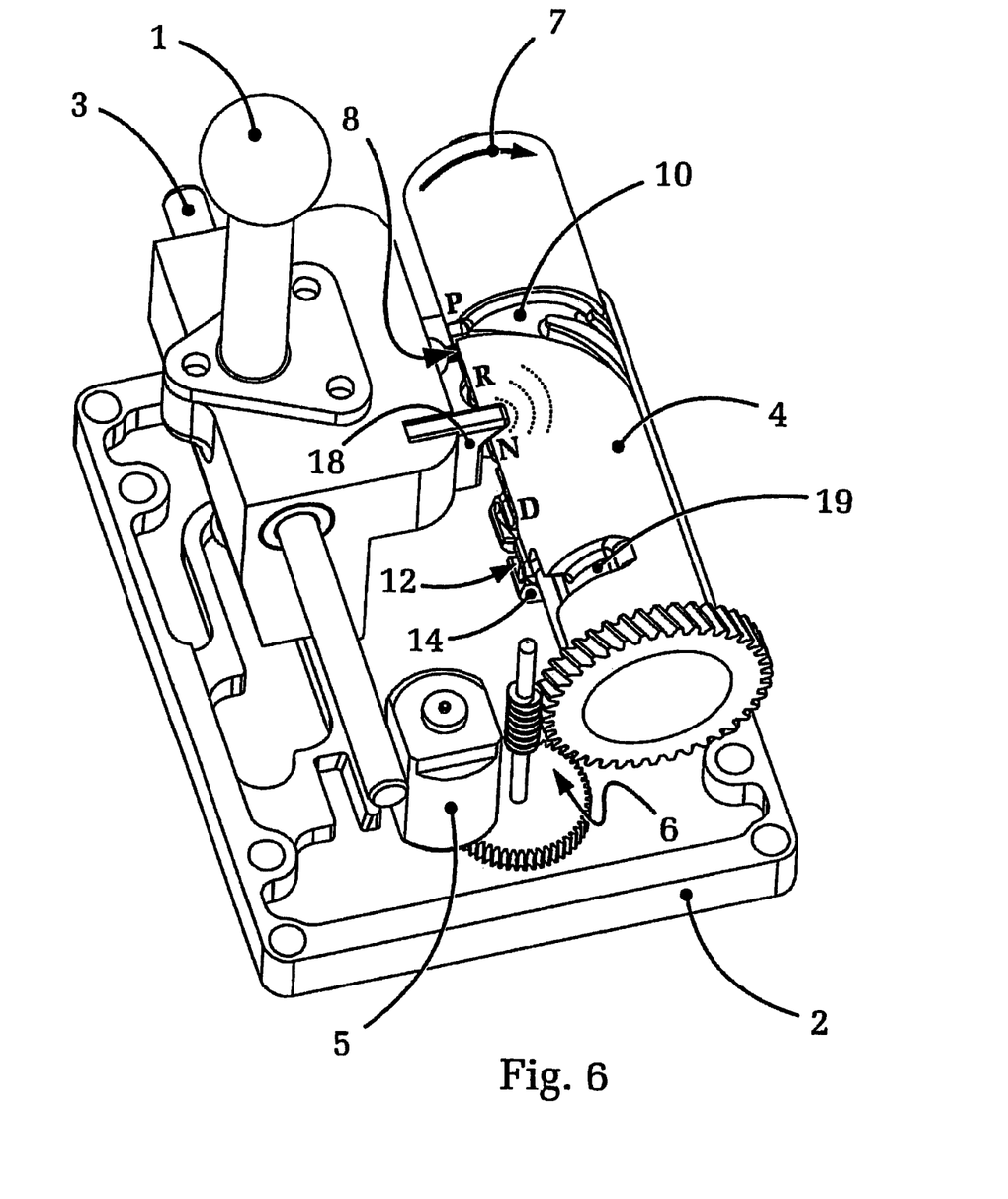
FIG. 6: the actuating device according to FIGS. 1 through 5, in a depiction and view that correspond to FIG. 1, with the selector lever in the parking lock position as shown in FIGS. 4 and 5.

The latter, namely the attained parking lock position "P", which is reached due to rotation 7 of gate shaft 4, is depicted in FIGS. 4 through 6. The position of gate shaft 4 in FIGS. 4 through 6 therefore corresponds to the position of gate shaft 4 in FIGS. 1 and 2, with the difference being that gate shaft 4 shown in FIGS. 4 through 6, as compared to FIGS. 1 and 2, has rotated by 180° in the clockwise direction (relative to the viewing direction of the helical gear of worm gear pair 6). FIGS. 5 and 6 show particularly clearly that, due to rotation 7 of gate shaft 4, detent pin 9 was returned along corresponding return groove 10 to parking lock position "P", which is why selector lever 1 shown in the illustrations in FIGS. 4 through 6 now also again assumes the parking lock position.

FIGS. 4 through 6 also show further detent plane 12 of notched gate 8, which belongs to the tip gate of selector lever 1. Tip gate detent plane 12 is connected to detent position "D" of notched gate 8 by a short section 13 of return groove 10 that belongs to parking lock position "D". Connecting piece 13 is also traveled along by detent pin 9 as it switches between detent plane 8, which belongs to the shift gate of selector lever 1, and detent plane 12, which belongs to the tip gate of selector lever 1. Detent plane 12, which belongs to the tip gate, is disposed on a ramp 14 that is also shown particularly clearly in FIG. 3. Return groove 10, which belongs to detent position "D", extends beyond ramp 14 as a continuation of connecting piece 13, which is likewise shown particularly clearly in the illustration in FIG. 3.

Due to detent plane 12, which is disposed on ramp 14 and belongs to the tip gate of selector lever 1, it is very easy to switch between the shift gate and the tip gate, and between shift gate detent plane 8 and tip gate detent plane 12 without the use of additional mechanics and with gate shaft 4 at a standstill by transferring the corresponding lateral swivelling motion 16 of selector lever 1 to detent pin 9 in a 1 to 1 manner in terms of angle. As a result, detent pin 9 is moved out of shift gate detent plane 8 and into tip gate detent plane 12, and the same applies for the return path of detent pin 9 out of tip gate detent plane 12 and into shift gate detent plane 8.

Figure 7:
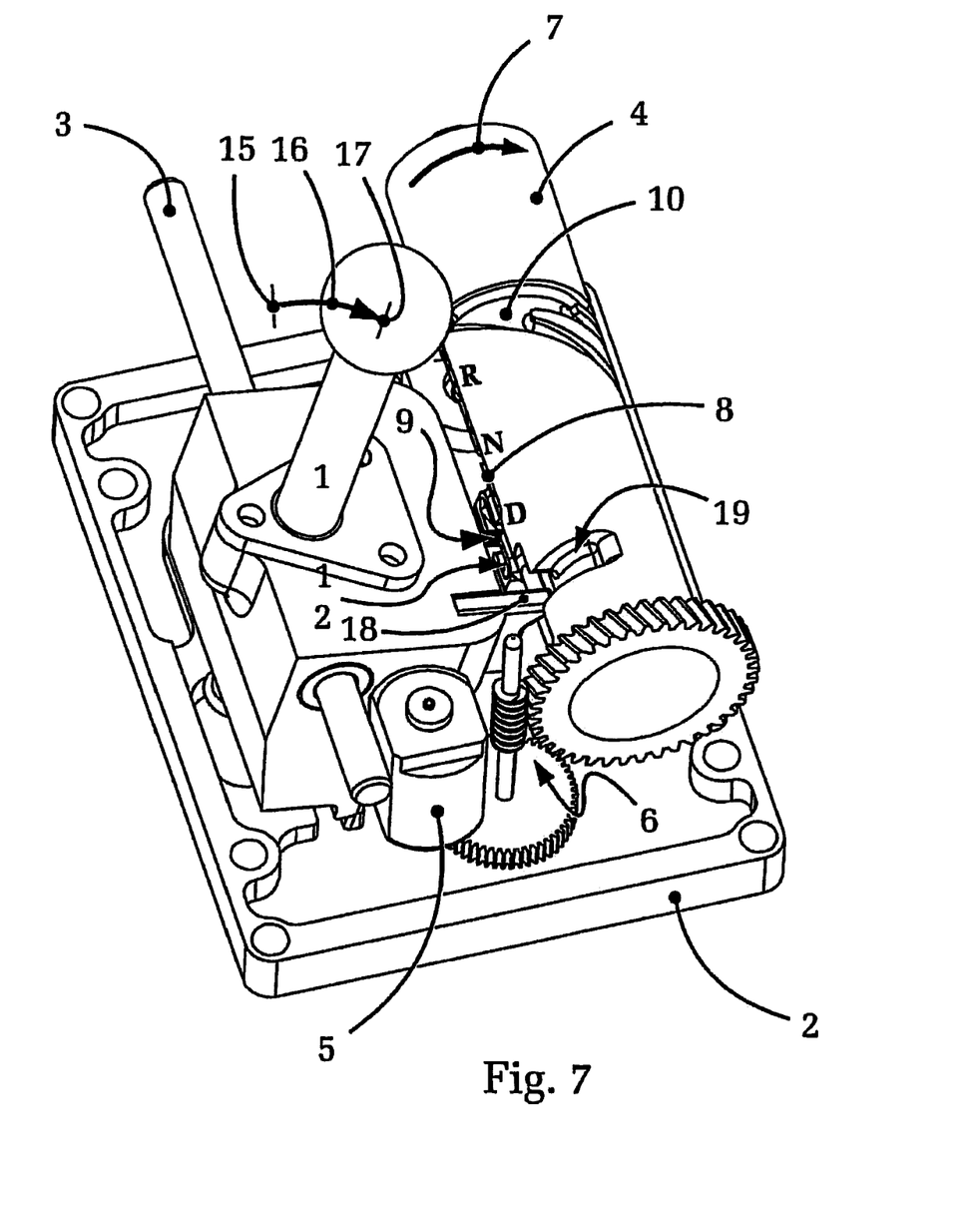
FIG. 7: the actuating device according to FIGS. 1 and 6, in a depiction and view that correspond to FIGS. 1 through 6, with the selector lever in the tip gate.
Figure 8:
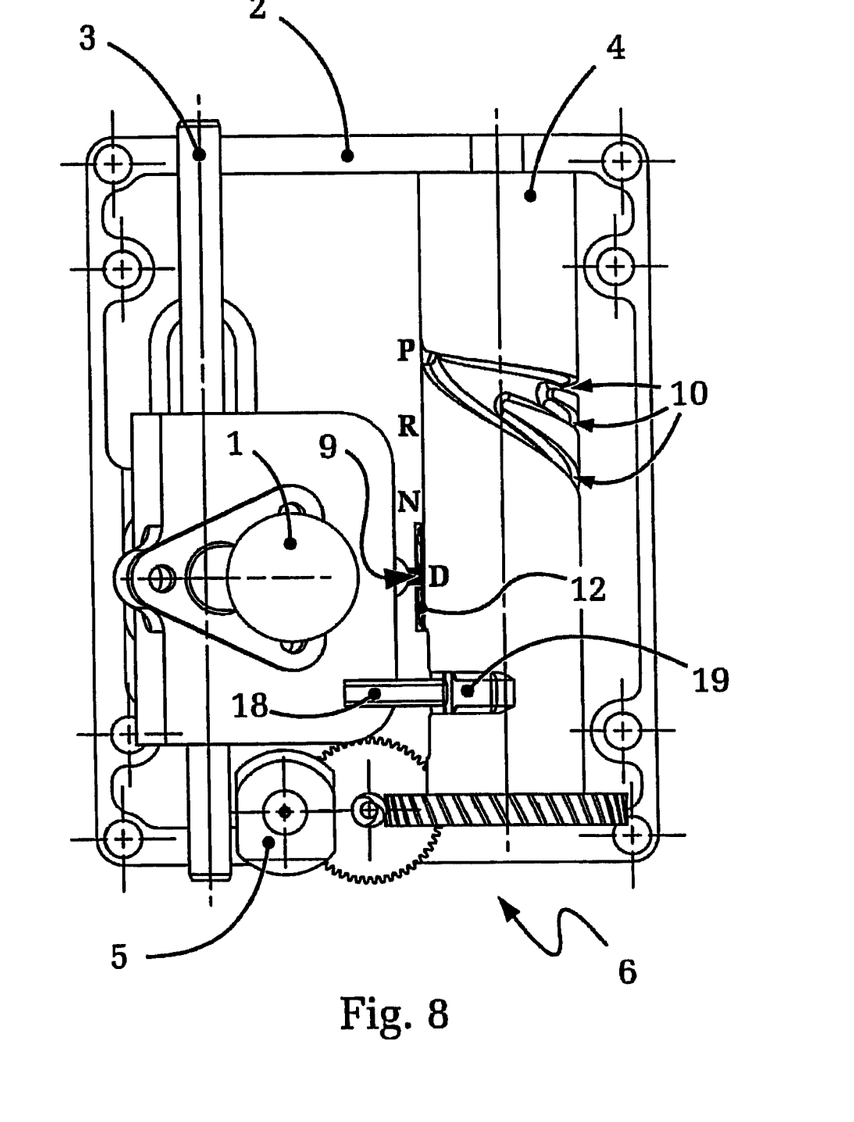
FIG. 8: a schematic top view of the actuating device according to FIGS. 1 through 5, with the selector lever in the tip gate as shown in FIG. 7.

The switch of detent pin 9 between detent planes 8 and 12 due to a swivelling motion 16 of selector lever 1 between shift gate position 15 and tip gate position 17 is depicted in FIGS. 7 and 8. FIG. 7 shows particularly clearly how swivelling motion 16 of selector lever 1 directly causes detent pin 9 to switch from shift gate detent plane 8 to tip gate detent plane 12. Selector lever 1 can also be easily returned to parking lock position "P" along return gate 10, which belongs to detent position "D" and extends past tip gate detent plane 12 and ramp 14, when selector lever 1 is located in the tip gate, as shown in FIGS. 7 and 8, see the illustration of ramp 14, and in return gate 10 shown in FIG. 3, which extends beyond ramp 14 and through tip gate detent plane 12.

The controlled return of selector lever 1 from tip gate position 17 shown in FIGS. 7 and 8 into shift gate position 15 shown in FIGS. 1 through 6 is ensured by the interaction of fixing projection 18 with release recess 19. Fixing projection 18 and release recess 19, which are likewise shown clearly in FIGS. 1 and 6, work together in a manner such that—starting from the relative position of fixing projection 18 and release recess 19 depicted in FIG. 7 (selector lever 1 in tip gate position 17)—fixing projection 18 is displaced out of the region of release recess 19 as soon as rotation 7 of gate shaft 4 begins. As a result, selector lever 1 is returned out of tip gate position 17 and into shift gate position 15 as soon as rotation 7 of gate shaft 4 begins. Subsequently thereto, detent pin 9 and, therefore, also selector lever 1 are returned from shift position "D" to parking lock position "P", as depicted above with reference to FIGS. 3 through 6.

A further effect of fixing projection 18 is that it forms a shift interlock that prevents selector lever 1 from being moved out of shift gate position 15 and into tip gate position 17 when selector lever 1 is located in a shift position other than "D". The swivelling motion of selector lever 1 in tip gate position 17 is blocked by fixing projection 18 striking the cylindrical surface of gate shaft 4 (see FIG. 6) when an attempt is made to swivel selector lever 1 out of shift gate position 15 and into tip gate position 17 if selector lever 1 is not in shift position "D". As soon as selector lever 1 is located in shift position "D", however, fixing projection 18 can enter into release recess 19, thereby releasing swivelling motion 16 of selector lever 1 into tip gate position 17.

In addition, due to its special T-shaped design (see FIGS. 4 through 7), release recess 19 is also used as an additional gate guide for selector lever 1 when the latter is located in the tip gate. If selector lever 1 is moved within the tip gate forward or backward, relative to the direction of travel, fixing projection 18 is located within the horizontal region of release recess 19. In this relative position of fixing projection 18 and release recess 19, any lateral motion 16 of selector lever 1 is blocked. In this case, selector lever 1 can only be displaced along bearing shaft 3 back to the center position of the tip gate. Selector lever 1 can be moved again laterally 16 back into shift gate position 15 only from the center position of tip gate.

In summary, it is clear that the invention provides an actuating device having stable selector lever positions and that has the particular advantage of the selector lever position always reflecting the actual gear state of the transmission, even in shift-by-wire-controlled gear shifting transmissions. As a result, the driver is provided with reliable visual and tactile feedback about the gear state of the transmission. Additional advantages are attained in the form of a design that is structurally simple and therefore reliable and robust, and in the form of low energy consumption by the actuators, combined with minimal noise production and space requirements.

The invention therefore makes an important fundamental contribution to the improvement of operator comfort, safety, as well as the efficient use of construction space, and cost effectiveness, in particular in the case of demanding applications in the field of transmission control.

LIST OF REFERENCE NUMERALS

1 Selector lever
2 Base
3 Bearing shaft
4 Gate shaft
5 Servoelectrical drive
6 Worm gear pair
7 Direction of rotation
8 Notched gate, shift gate detent plane
9 Detent element, interlock pin
10 Return grooves
11 Direction of motion
12 Tip gate detent plane
13 Connecting piece
14 Gate ramp
15 Shift gate position
16 Swivelling motion
17 Tip gate position
18 Fixing projection
19 Release recess

The invention claimed is:

1. An actuating device for selecting shift stages of a shift-by-wire gear shifting transmission, the actuating device comprising:
a selector lever (1) having stable selector lever positions, the selector lever (1) being movable between at least one gear selection position and a parking lock position and comprising a detent mechanism having a spring-loaded detent element (9) and
a notched gate (8) having at least first and second detent positions (P, R, N, D),
the detent element (9) being connected to the selector lever (1),
a cylindrical gate shaft (4) having a cylindrical surface in which the notched gate is notched and having at least one helically wound return groove (10) which receives the detent element (9), and the gate shaft (4) being rotatable (7) about a longitudinal axis so as to change an axial location of the detent element within the return groove, the return groove extending circumferentially about the gate shaft from a start position to a target position, both ends of the return groove are connected to the notched gate such that the return groove and the notched gate form an endless groove about the gate shaft.

2. The actuating device according to claim 1, wherein the start position of the return groove (10) coincides with at least one first detent position (R, N, D) of the notched gate (8), and the target position coincides with a further detent position (P) of the notched gate (8).

3. The actuating device according to claim 2, wherein the gate shaft (4) has a return groove (10) for each of the at least one first detent positions (R, N, D), and each one of the return grooves (10) leads to a common target position (P).

4. The actuating device according to claim 1, wherein, on the gate shaft, the notched gate has a first detent plane for a shift gate position (15) of the selector lever (1), and a further detent plane for a tip gate position (17) of the selector lever (1).

5. The actuating device according to claim 4, wherein the further tip gate detent plane (12) of the notched gate is disposed on a gate ramp (14), and the gate ramp (14), which is directly adjacent to the shift gate detent plane, is disposed on the gate shaft (4).

6. The actuating device according to claim 4, wherein the detent position in the tip gate detent plane (12) corresponding to a tip gate center position of the selector lever (1) and forms the start position of the return groove (10).

7. The actuating device according to claim 4, wherein the return groove (10) for a selector lever position "D" extends (13) from the shift gate detent plane beyond the center detent position of the tip gate detent plane (12).

8. The actuating device according to claim 1, wherein by a fixing projection (18), which is connected to a bearing of the detent element (9) and to the selector lever (1), and a release recess (19), corresponding in form to the fixing projection (18) that is located in the surface of the gate shaft so that, when the selector lever (1) is moved out of a selector lever position "D" of the shift gate and into a tip gate position (17), the fixing projection (18) enters a release recess (19) while the fixing projection (18) blocks swivel motion (16) of the selector lever (1) in a direction of the tip gate position (17) when the selector lever (1) is not located in the selector lever position "D".

9. The actuating device according to claim 8, wherein the fixing projection (18) and the release recess (19) form a slide ramp, and the slide ramp is designed to eject the fixing projection (18) out of the release recess (19) and thereby return the selector lever (1) out of the tip gate position (17) and into a shift gate position (15) at a beginning of the rotational motion (7) of the gate shaft (4).

10. The actuating device according to claim 1, wherein the gate shaft (4) is rotated by actuation of an actuator that includes a worm gear pair (6).

11. The actuating device according to claim 1, wherein the selector lever (1) is supported on a bearing shaft (3) that is parallel to the gate shaft, the bearing shaft facilitates both translatory shifting motion (11) as well as rotational shifting motion (16) of the selector lever.

12. The actuating device according to claim 1, wherein the selector lever (1) is pivotable independent of the gate shaft (4).

13. The actuating device according to claim 1, wherein
the selector lever (1) is spaced from the gate shaft (4);
the selector lever (1) is slideable and pivotable along a bearing shaft (3) with respect the gate shaft (4); and
the bearing shaft (3) is parallel to and spaced from the longitudinal axis of the gate shaft (4).

14. The actuating device according to claim 13, wherein the gate shaft (4) is rotatable (7) independent of the bearing shaft (3).

15. The actuating device according to claim 1, wherein the detent element (9) is movable with respect to the gate shaft (4), and upon rotation (7) of the gate shaft (4), an axial position of the detent element changes with respect to the gate shaft (4) within the return groove, from the start position, along the return groove, into the target position.

16. The actuating device according to claim 1, wherein the selector lever (1) defines another longitudinal axis that is substantially perpendicular to the longitudinal axis of the gate shaft (4).

17. An actuating device for selecting shift stages of a shift-by-wire gear shifting transmission, the actuating device comprising:
- a selector lever (1) being shiftable between at least one stable gear selection position and a stable parking lock position;
- a detent mechanism is connected to the selector lever and comprises a spring-loaded detent element (9);
- a cylindrical gate shaft (4) that comprises a cylindrical surface and rotates about a rotational axis, the cylindrical surface gate shaft having at least one helical return groove (10) which receives and axially biases the detent element (9), due to rotation (7) of the gate shaft (4), from a start position, along the return groove (10), into a target position; and
- the cylindrical surface of the gate shaft having a linear notched gate that is notched therein and that extends axially along the gate shaft and parallel to the rotational axis of the gate shaft, an axial end of the notched gate forms the target position of the detent element and the start position of the detent element is located within the notched gate remote from the axial end thereof, one end of the return groove is connected to the notched gate at the start position of the detent element and an opposite end of the return groove is connected to the notched gate at the target position of the detent element such that the notched gate and the return groove form an endless groove circumferentially about gate shaft.

* * * * *